United States Patent
Stuetzler et al.

(10) Patent No.: US 8,060,279 B2
(45) Date of Patent: Nov. 15, 2011

(54) METHOD AND DEVICE FOR GENERATING AT LEAST ONE FEATURE FOR AN OCCUPANT PROTECTION SYSTEM

(75) Inventors: Frank Juergen Stuetzler, Farmington Hills, MI (US); Armin Koehler, Sachsenheim (DE); Sabine Brandenburger, Paris (FR); Hermann Schuller, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 554 days.

(21) Appl. No.: 11/992,273

(22) PCT Filed: Aug. 2, 2006

(86) PCT No.: PCT/EP2006/064969
§ 371 (c)(1),
(2), (4) Date: Mar. 10, 2009

(87) PCT Pub. No.: WO2007/033854
PCT Pub. Date: Mar. 29, 2007

(65) Prior Publication Data
US 2009/0177358 A1   Jul. 9, 2009

(30) Foreign Application Priority Data
Sep. 20, 2005   (DE) .......................... 10 2005 044 767

(51) Int. Cl.
*B60R 21/0136* (2006.01)
(52) U.S. Cl. ............................. 701/45; 701/46; 180/282
(58) Field of Classification Search .................. 701/45, 701/42, 46, 47; 280/734, 735; 180/282; 307/9.1, 10.1
See application file for complete search history.

(56) References Cited

U.S. PATENT DOCUMENTS

| | | | |
|---|---|---|---|
| 5,928,300 A * | 7/1999 | Rogers et al. | 701/45 |
| 6,125,313 A | 9/2000 | Watanabe et al. | |
| 6,243,633 B1 * | 6/2001 | Kanameda et al. | 701/45 |
| 6,278,923 B1 * | 8/2001 | Kanameda | 701/45 |
| 6,512,969 B1 | 1/2003 | Wang | |
| 6,952,636 B2 * | 10/2005 | Link et al. | 701/45 |
| 7,292,921 B2 * | 11/2007 | Schuller et al. | 701/45 |
| 2001/0021890 A1 * | 9/2001 | Kanameda | 701/45 |
| 2002/0013648 A1 * | 1/2002 | Feser et al. | 701/45 |
| 2002/0169534 A1 * | 11/2002 | Yamashita | 701/45 |
| 2003/0023359 A1 * | 1/2003 | Kueblbeck et al. | 701/45 |
| 2003/0127271 A1 * | 7/2003 | Hayasaka et al. | 180/274 |
| 2005/0010346 A1 * | 1/2005 | Link et al. | 701/45 |
| 2005/0096816 A1 * | 5/2005 | Takafuji et al. | 701/45 |

(Continued)

FOREIGN PATENT DOCUMENTS

| | | |
|---|---|---|
| EP | 1 323 592 | 7/2003 |
| JP | 2001-171476 | 6/2001 |
| JP | 2004-516193 | 6/2004 |

(Continued)

*Primary Examiner* — Paul N. Dickson
*Assistant Examiner* — Barry Gooden, Jr.
(74) *Attorney, Agent, or Firm* — Kenyon & Kenyon LLP

(57) ABSTRACT

A method is described for generating at least one feature for an occupant protection system, which is determined from at least one basic feature and analyzed for generating a triggering signal for an occupant protection device, and a corresponding device. During normal operation, at least one short-term window integral is calculated from the at least one basic feature and used as a starting value for calculating a corresponding long-term integral when a starting condition for a crash operation obtains, the at least one long-term integral being made available to a following method as a feature for generating the triggering signal for the occupant protection system.

8 Claims, 1 Drawing Sheet

U.S. PATENT DOCUMENTS

| | | | |
|---|---|---|---|
| 2005/0192731 A1* | 9/2005 | Eisele et al. | 701/45 |
| 2006/0095183 A1* | 5/2006 | Schuller et al. | 701/45 |
| 2007/0124047 A1* | 5/2007 | Roelleke | 701/45 |
| 2007/0272468 A1* | 11/2007 | Koehler et al. | 180/282 |
| 2008/0185825 A1* | 8/2008 | Stuetzler et al. | 280/735 |
| 2008/0281492 A1* | 11/2008 | Theisen | 701/45 |

FOREIGN PATENT DOCUMENTS

| | | |
|---|---|---|
| JP | 2005-508792 | 4/2005 |
| WO | WO 02/053419 | 7/2002 |
| WO | WO 03/042007 | 5/2003 |
| WO | 2005/061281 | 7/2005 |

* cited by examiner

METHOD AND DEVICE FOR GENERATING AT LEAST ONE FEATURE FOR AN OCCUPANT PROTECTION SYSTEM

FIELD OF THE INVENTION

The present invention is directed to a method for generating at least one feature for an occupant protection system or an associated device.

BACKGROUND INFORMATION

A method for generating at least one feature for an occupant protection system based on a detected acceleration signal usually receives acceleration data continuously after initialization of an associated control unit. By analyzing such acceleration data, this method determines whether the vehicle is in a normal driving situation or in a potential crash situation at a given moment. A crash situation is referred to as a potential crash situation because the method cannot always decide reliably up to this point in time whether it is an actual crash or a case of misuse. During the normal driving situation, large portions of the method are in a dormant state or in a reset state, i.e., no calculations are performed, thus allowing an approach that conserves computer capacity. When a potential crash incident is detected, the parts of the method that are in a dormant state are also activated and, for example, features such as vehicle deceleration and/or forward displacement of occupants during the crash are calculated, threshold value curves are analyzed, functions are calculated pertaining to triggering decisions, etc.

If, after leaving the dormant state, it is found that it is only a misuse situation, it is necessary to ensure that the calculated features and variables, such as the deceleration and forward displacement of occupants, are restored to their starting state after the end of the misuse situation.

Known methods for generating at least one feature for an occupant protection system frequently use window integrators that calculate the features of deceleration and occupant forward displacement based on a detected acceleration signal. The window integrators are automatically reset to a starting value when no significant directional acceleration signal is applied for a prolonged period of time, i.e., the window integrators have a memory limited in time by the length of the window. In an alternative approach, the integrators are started for calculation of the features of deceleration and occupant forward displacement only when the detected acceleration signal reaches or exceeds a so-called noise threshold. If this noise threshold is no longer exceeded by the detected acceleration signal for a prolonged period of time, the integrators are reset again and/or reintegrated over a constant value or reset immediately to a starting state.

SUMMARY OF THE INVENTION

The method according to the present invention for generating at least one feature for an occupant protection system having the features described herein has the advantage over the related art that during normal operation at least one short-term window integral is calculated from the at least one basic feature, this integral supplying a starting value for calculation of a corresponding long-term integral when a starting condition for crash operation prevails, the at least one long-term integral supplying the features for generating the triggering signal for the occupant protection device to a following method. The method according to the present invention implements an approach that conserves computer capacity in an advantageous manner by calculating a short-term window integral in normal operation, and by transferring starting values for calculation of the long-term integral after a potential crash situation is detected, it allows more rapid calculation of the features, which are analyzed by following methods for generating a triggering signal for the occupant protection arrangement, resulting in a shorter running time on the whole for the decision as to whether triggering of the occupant protection arrangement is necessary. By combining the calculation of the at least one short-term window integral with the calculation of the at least one corresponding long-term integral, the method according to the present invention advantageously generates robust starting conditions without losing any information about the features to be calculated.

The device according to the present invention for generating at least one feature for an occupant protection system having the features also described herein includes the required arrangement for performing the method according to the present invention for generating at least one feature of an occupant protection system.

The measures and refinements characterized in the dependent claims allow advantageous improvements on the method characterized herein for generating at least one feature for an occupant protection system and the corresponding device characterized herein.

It is particularly advantageous that during crash operation the at least one basic feature is monitored to restore the system to normal operation when predefined conditions prevail, but to restore the system from crash operation to normal operation, a restoration procedure is triggered for the at least one long-term integral by the fact that the monitored basic feature reaches or drops below a predefined threshold value. Due to the restoration procedure of the long-term integral, the advantages of a self-resetting window integrator are combined with an expanded method for restoration of the long-term integrator in an advantageous manner to avoid losing any information about the features prior to the potential onset of the crash and nevertheless to have the maximum possible flexibility for the restoration of the features and/or variables calculated via the long-term integral after the potential crash state.

It is therefore advantageously possible to perform various restoration variants as a function of a situation that is recognized, such as a restoration using a constant value or a restoration using a fixed or variable reducing factor or a restoration to a predefined fixed or variable starting value. The long-term integral is reset in relation to its current value via the restoration using a reducing factor. In comparison with a restoration using a predefined constant value, this yields a more stable restoration period of time between very large and very small integrator values. This is important for so-called follow-up situations, for example, when a crash situation follows a misuse situation.

It is advantageous in particular that at least one of the long-term integrals is fed back for generating a system reset signal, the system reset signal resetting all system components into a starting state.

The method according to the present invention may generate the features of deceleration and/or occupant forward displacement from an acceleration signal detected as a basic feature, these features being analyzed to generate the triggering signal for the occupant protection arrangement.

An exemplary embodiment of the present invention is illustrated in the drawing and described below.

BRIEF DESCRIPTION OF THE DRAWING

The FIGURE shows a block diagram of an exemplary embodiment of a device for performing a method according to the present invention for generating at least one feature for an occupant protection system.

DETAILED DESCRIPTION

Figure 1:
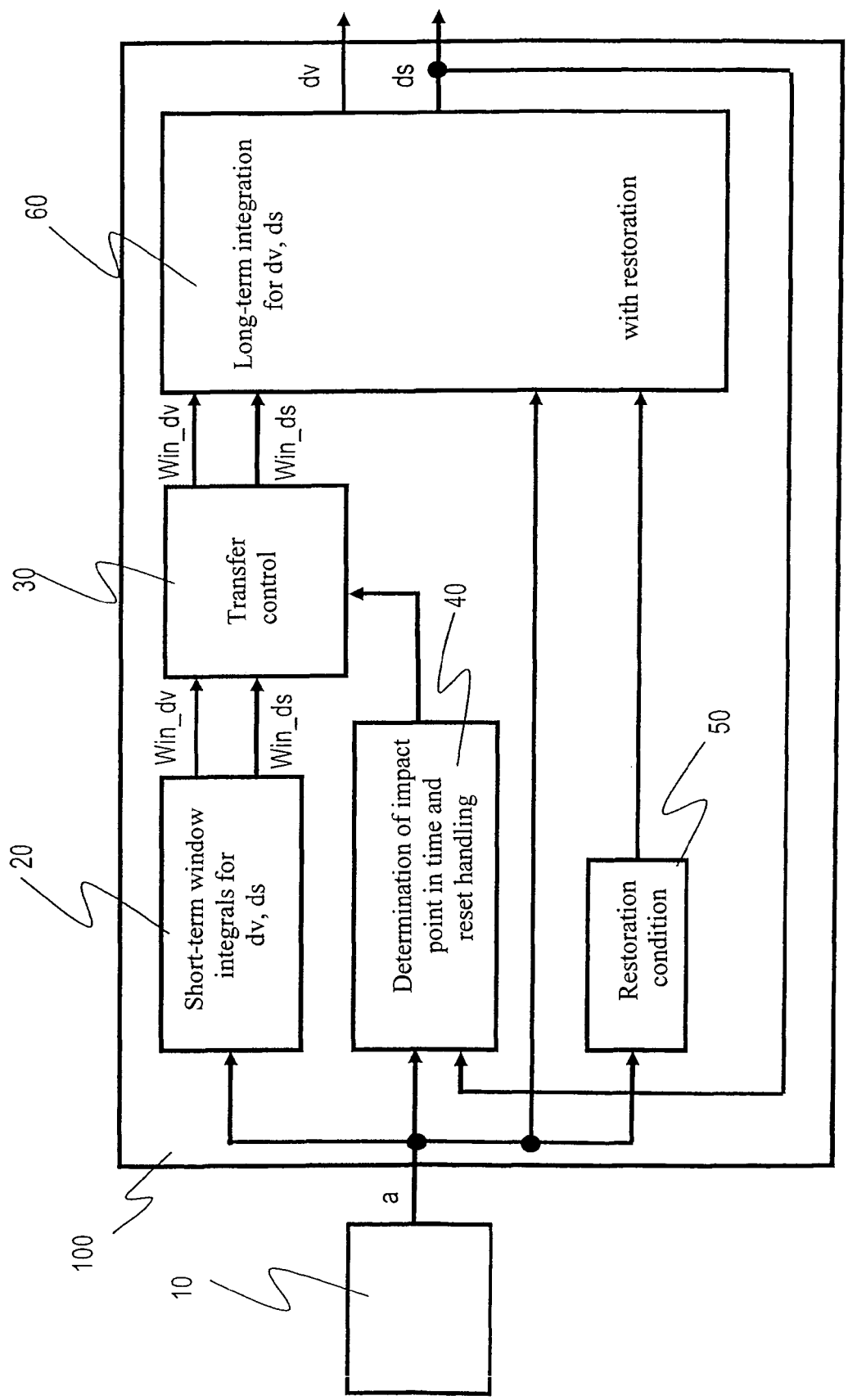

As shown in the FIGURE, a device for generating at least one feature dv, ds for an occupant protection system includes a central sensor system 10 which detects at least one basic feature a, and an analyzer and control unit 100 which analyzes the at least one basic feature a and generates at least one feature dv, ds and outputs it to a following method or a following device for generating a triggering signal for an occupant protection device. In the same exemplary embodiment, an acceleration signal a is detected as the basic feature by central sensor system 10 and transmitted to analyzer and control unit 100 for analysis. Analyzer and control unit 100 determines the features of deceleration dv and/or occupant forward displacement ds from acceleration signal a detected as the basic feature.

To generate the features of deceleration dv and occupant forward displacement ds, analyzer and control unit 100 includes a short-term integrator unit 20, a transfer control 30, and a long-term integrator unit 60. From at least one basic feature a, short-term integrator unit 20 calculates a first short-term window integral Win_dv and a second short-term window integral Win_ds in a resource-sparing manner during normal operation up to the detected start of a potential crash situation. A block 40 recognizes through corresponding processing and/or analysis of acceleration signal a the start condition for the potential crash operation and, when a potential crash operation is detected, activates transfer control 30. The starting conditions for crash determination are implemented in such a way that a potential crash situation is detected promptly enough before the required triggering time. Transfer control 30 transfers calculated short-term integrals Win_dv, Win_ds as the starting value to long-term integrator unit 60 when the starting condition for a potential crash operation is ascertained in block 40.

Long-term integrator unit 60 calculates the particular long-term integrals for deceleration dv and occupant forward displacement ds on the basis of starting values Win_dv, Win_ds from the at least one basic feature a in the following cycles and outputs the calculated long-term integrals during crash operation as features of deceleration dv and occupant forward displacement ds to the following method for generating the triggering signal for the occupant protection device. This has the advantage that it is possible to generate robust starting conditions on the one hand while on the other hand none of the information about deceleration dv and occupant forward displacement ds is lost.

In block 50, analyzer and control unit 100 monitors the at least one basic feature a during crash operation, with a check being performed to ascertain whether the at least one basic feature a meets predefined restoration conditions. For example, it is possible to check on whether a monitored basic feature a reaches or drops below a predefined threshold value. If the predefined restoration conditions are met, then block 50 triggers a restoration operation for at least one long-term integral dv, ds for restoring normal operation after crash operation. Long-term integral dv, ds may be restored, e.g., using a constant value and/or a reducing factor. Furthermore, the reducing factor may be variably set, ranging from 0 to 1, as a function of the application executed. Thus, when using the reducing factor, the long-term integral may be restored in relation to its present value. The restoration period of time between very large and very small integrator values is thus more stable in comparison with a restoration using a constant value.

The embodiment according to the present invention as described here combines the advantages of a self-resetting window integral with an expanded method of integrator restoration, so that no information about deceleration dv or occupant forward displacement ds up to the start of the crash is lost and a flexible restoration to these features dv, ds is possible. Due to the flexible restoration of features, it is possible to determine in an advantageous manner how rapidly a particular application and/or situation is restored to the starting state as a function of the application executed or the situation recognized. This is important in particular for so-called follow-up situations, e.g., when a crash situation follows a misuse situation.

To generate a system reset signal, at least one long-term integral and/or a feature ds, dv may be fed back to block 40. In the exemplary embodiment presented here, the feature known as occupant forward displacement ds is fed back and block 50 is generated from the at least one feedback feature and the basic feature of the system reset signal, which is able to reset all system components into a starting state.

The FIGURE designations include the following:
20—Short-term window integrals for dv, ds
30—Transfer control
40—Determination of impact point in time and reset handling
50—Restoration condition
60—Long-term integration for dv, ds
with restoration

What is claimed is:

1. A method for generating at least one feature for an occupant protection system, the method comprising:
   determining the at least one feature from at least one basic feature;
   analyzing the at least one feature to generate a triggering signal for an occupant protection device; and
   determining, during a normal operation, at least one short-term window integral from the at least one basic feature, which is used as a starting value for determining a corresponding long-term integral when there is a starting condition for a crash operation, the corresponding long-term integral being made available to a following process as the at least one feature for generating the triggering signal for the occupant protection device.

2. The method of claim 1, wherein the starting condition for crash operation is determined from the at least one basic feature.

3. The method of claim 1, wherein the corresponding long-term integral is fed back to generate a system reset signal, and the system reset signal resets all system components into a starting state.

4. The method of claim 1, wherein the at least one generated feature corresponds to at least one of a deceleration and an occupant forward displacement, which are determined from a detected acceleration signal as the basic at least one feature.

5. The method of claim 1, wherein during crash operation, the at least one basic feature is monitored, and wherein a restoration procedure for the corresponding long-term integral is triggered to restore the occupant protectant system from the crash operation to the normal operation based on the monitored at least one basic feature dropping below a predefined threshold value.

6. The method of claim 5, wherein the corresponding long-term integral is restored using a reducing factor.

7. The method of claim 6, wherein the reducing factor is variably set in a range from 0 to 1 as a function of an executed application.

8. A device for generating at least one feature for an occupant protection system, comprising:
- at least one sensor to detect at least one basic feature; and
- an analyzer and control unit to analyze the at least one basic feature and generating the at least one feature and outputting the at least one feature for generating a triggering signal for an occupant protection device;
- wherein during normal operation, the analyzer and control unit determines at least one short-term window integral from the at least one basic feature and uses the determined short-term integral as a starting value for determining a corresponding long-term integral when there is a starting condition for a crash operation, and wherein the analyzer and control unit make the corresponding long-term integral available to a following process as the at least one feature for generating the triggering signal for the occupant protection device during the crash operation.

* * * * *